United States Patent
Yung et al.

(10) Patent No.: US 8,274,368 B2
(45) Date of Patent: Sep. 25, 2012

(54) CHIPLESS MICROWAVE IDENTIFICATION TAG

(75) Inventors: Kai Leung Yung, Hong Kong (CN);
Ching Yuen Chan, Hong Kong (CN);
David Ki Wai Cheng, Hong Kong (CN)

(73) Assignee: The Hong Kong Polytechnic University, Kowloon (HK)

( * ) Notice: Subject to any disclaimer, the term of this patent is extended or adjusted under 35 U.S.C. 154(b) by 734 days.

(21) Appl. No.: 12/396,127

(22) Filed: Mar. 2, 2009

(65) Prior Publication Data

US 2009/0267739 A1  Oct. 29, 2009

Related U.S. Application Data

(60) Provisional application No. 61/071,455, filed on Apr. 29, 2008.

(51) Int. Cl.
*H04Q 5/22*  (2006.01)
(52) U.S. Cl. ......... 340/10.1; 340/572.9; 340/572.7; 340/572.8; 342/42; 342/51; 342/175
(58) Field of Classification Search ........ 340/10.1, 340/572.9, 572.7, 572.8; 342/42, 51, 175, 342/44, 50; 235/439, 375
See application file for complete search history.

(56) References Cited

U.S. PATENT DOCUMENTS

| | | | |
|---|---|---|---|
| 4,123,754 A * | 10/1978 | Armstrong | 342/44 |
| 4,684,929 A * | 8/1987 | Edwards et al. | 340/541 |
| 5,237,291 A * | 8/1993 | Hjipieris et al. | 331/2 |
| 5,945,938 A * | 8/1999 | Chia et al. | 342/42 |
| 6,946,950 B1 * | 9/2005 | Ueno et al. | 340/10.1 |
| 6,950,009 B1 * | 9/2005 | Nysen | 340/10.41 |
| 2006/0071795 A1 * | 4/2006 | Benedikt | 340/572.7 |
| 2009/0079578 A1 * | 3/2009 | Dvorsky | 340/604 |
| 2009/0160654 A1 * | 6/2009 | Yang | 340/572.9 |
| 2011/0024509 A1 * | 2/2011 | Mingle et al. | 235/488 |

* cited by examiner

*Primary Examiner* — Hoi Lau
(74) *Attorney, Agent, or Firm* — Muncy, Geissler, Olds & Lowe, PLLC

(57) ABSTRACT

A chipless microwave identification tag (200) comprising: a dielectric substrate (210); and a plurality of antenna elements (220) made from a conductive material and disposed on at least one surface (205, 255) of the dielectric substrate (210); wherein when the tag (200) is excited by an incident microwave signal (131), a reflected wave (141) to identify the tag (200) is generated with a number of specific frequencies altered by microwave resonation of the antenna elements (220).

9 Claims, 7 Drawing Sheets

CHIPLESS MICROWAVE IDENTIFICATION TAG

TECHNICAL FIELD

The invention concerns identification tags, and more specifically, to a chipless microwave identification tag having data content. The invention also concerns methods of operating and manufacturing such a tag.

BACKGROUND OF THE INVENTION

One reason that has delayed widespread usage of Radio Frequency Identification (RFID) tags is cost. Typical application areas of RFID tags include recycle monitoring, security printing, underground pipes distinguishing and ticket identification that may not be able to use barcodes. In comparison to RFID tags, the barcode system is relatively mature, and more importantly, the cost of a barcode is nearly zero. Unlike a barcode, a chipless RFID tag contains bits of data that can be quietly and electronically detected at a distance even if it is not visible. Problems of orientation and obscuration are no longer a problem. The key criticism of chipless RFID tags is that they do not provide remote rewritable capability. But this is not always a problem as modern networks can facilitate the management of all information centrally and an ID/serial number is adequate enough to serve as the only key to retrieve the required information through the network. In fact, chipless tags with fixed data have proven to be more robust than those with rewritable capability. A read only device is electronically addressed more securely, more reliably, less costly and longer operating range than a read-write device.

Chipless RFID tags are widely used in the identification of goods and logistics tracking. Their principle of operation has several variations. U.S. Pat. No. 6,966,493 discloses a Surface Acoustic Wave (SAW) device that works on the principle of a surface acoustic wave traveling along the surface of some piezoelectric materials and the resonance generated thereof with metallization on surface generates different frequencies of electromagnetic waves and is transmitted back to receivers at different time intervals. Such an arrangement suffers from the restricted angle of incident of the radio wave.

Therefore, it is desirable to provide a tag that is relatively inexpensive to manufacture, has a small form factor and is more effective and accurate than some prior art tags used for identification.

SUMMARY OF THE INVENTION

In a first preferred aspect, there is provided a chipless microwave identification tag which has a dielectric substrate; and a plurality of antenna elements made from a conductive material and disposed on at least one surface of the dielectric substrate. When the tag is excited by an incident microwave signal, a reflected wave to identify the tag is generated with a number of specific frequencies altered by microwave resonation of the antenna elements.

The antenna elements may be pads and have a plurality of extending arms. The antenna elements may be concentric rings.

The tag may be encoded based on the specific microwave resonation measured after fabrication of the tag.

A binary coding system may be used to encode the tag based on the measurement of the microwave resonation from each tag.

The microwave band of operation for the tag may be from about 14 to about 18 GHz and is divided into 100 equal frequency slots, each frequency slot corresponding to a bit occupying 0.04 GHz.

If the strength of any microwave resonation is larger than a predetermined value, a code number "1" may be assigned to the bit; and if the strength of any resonation is less than the predetermined value, a code number "0" is assigned to the bit.

The predetermined value may be 5 dB changes during the frequency slot.

The reflected wave may be decoded to obtain an identification number of the tag.

In a second aspect, there is provided a method for identifying a chipless microwave identification tag having antenna elements. The method requires exciting the tag using an incident microwave signal; and decoding a reflected wave generated in response to the microwave excitation, the reflected wave having a number of specific frequencies altered by microwave resonation of the antenna elements.

The decoding of the reflected wave may obtain an identification number of the tag.

In a third aspect, there is provided a system for identifying a chipless microwave identification tag. The system has a microwave signal generator to excite the tag using an incident microwave signal; and a reader to decode a reflected wave generated in response to the microwave excitation, the reflected wave having a number of specific frequencies altered by microwave resonation of the antenna elements.

The system may further comprise a signal processing module to obtain an identification number of the tag by determining if the strength of any microwave resonation is larger than a predetermined value, a code number "1" is assigned to the bit; and if the strength of any resonation is less than the predetermined value, a code number "0" is assigned to the bit.

In a fourth aspect, there is provided a method for manufacturing a chipless microwave identification tag. The method requires injection moulding to form the tag; forming antenna elements on the tag; and trimming the antenna elements to predetermined sizes. The tag is encoded with an identification number based on the number of specific frequencies present in a reflected wave generated after excitation of the tag by an incident microwave signal.

The present invention uses microwave resonation to alter the response of the reflected wave at some specific frequency to identify the occurrence of a tag. The dimensional accuracy of a tag is solved at low cost and therefore microwave tags are high suitable for mass production. One low cost production method that can provide persistent quality and dimensional accuracy is high precision micro/nano injection of conductive polymer composite. The present invention may be produced to the dimensional accuracy required using a high precision micro/nano injection moulding machine. U.S. Pat. No. 7,258,543 discloses an injection moulding machine which can be used for the production of the present invention at the required accuracy and low cost.

BRIEF DESCRIPTION OF THE DRAWINGS

An example of the invention will now be described with reference to the accompanying drawings, in which.

DETAILED DESCRIPTION OF THE DRAWINGS

Figure 1:
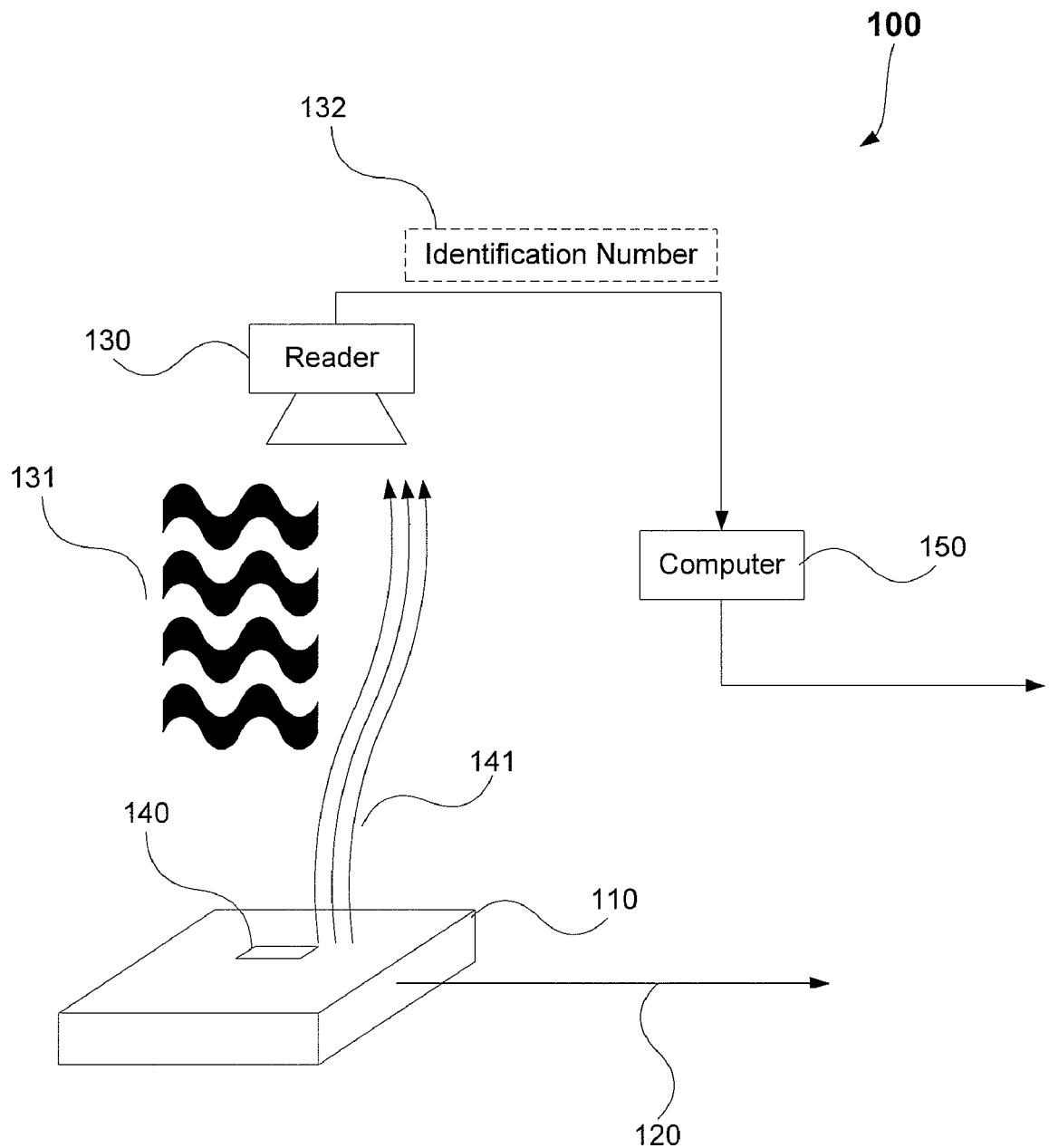
FIG. 1 is a block diagram of a system for identifying an article.

Referring to FIG. 1, a system 100 for identifying an article 110 when it is carried through a reader 130 in a predetermined direction 120 is provided. A microwave identification tag 140 is affixed on or placed within the article 110. When the article 110 passes through the reader 130, the reader 130 transmits a microwave signal 131 to interrogate the article 110 and excite the tag 140. This initiates a response from the tag 140 in the form of a reflected wave 141. The response 141 is detected by the reader 130. The reader 130 then decodes the response 141 to obtain the identification number for the tag 140 on the article 110. The decoding may be performed by a signal processing module provided in the reader 130. The identification number 132 of the tag 140 or article 110 acquired by the identification system 100 is passed and stored in a computer 150 for further processing, for example, input into a database with a time stamp.

Figure 2:
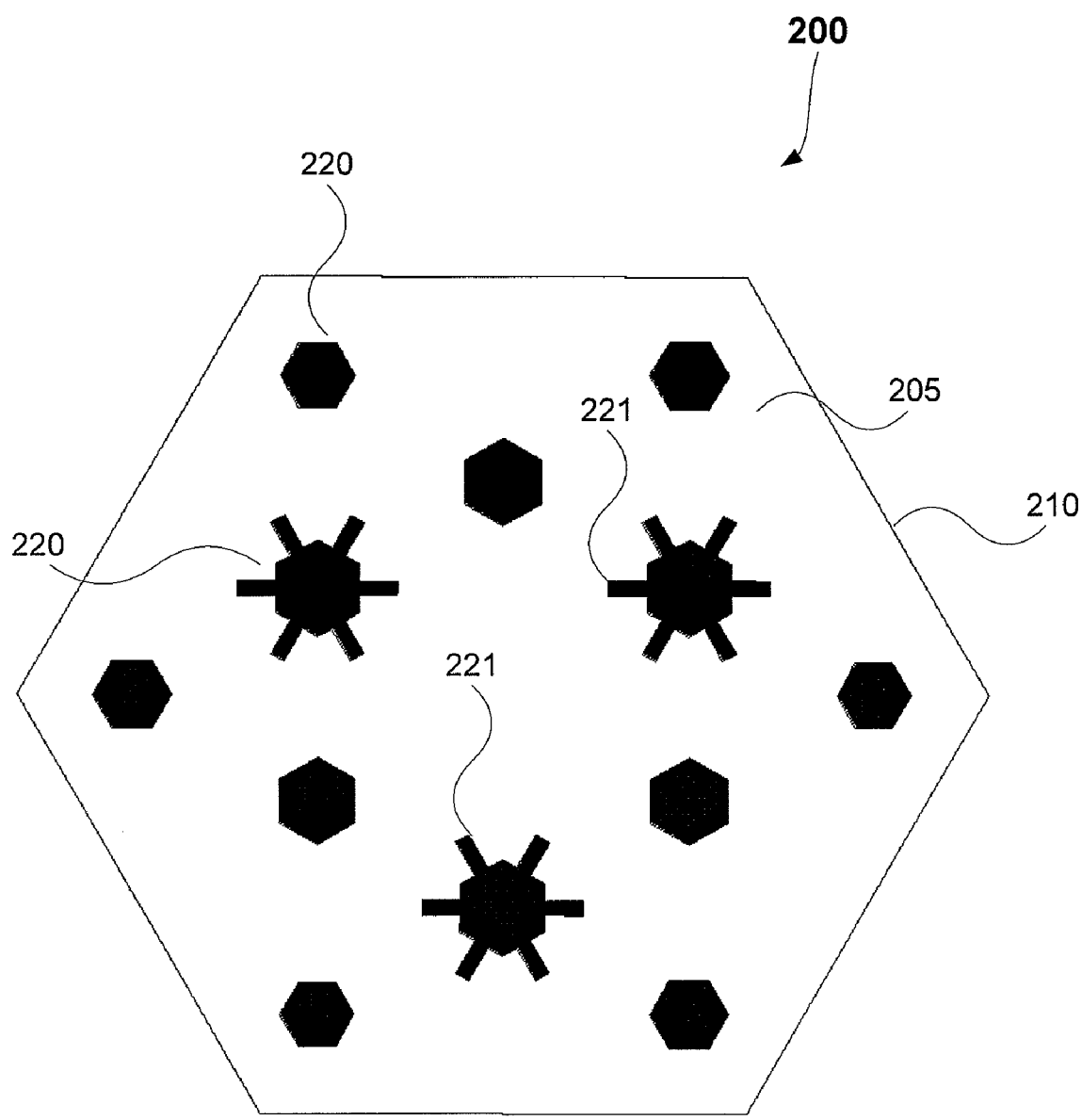
FIG. 2 is a plan view of a top surface of an embodiment of a chipless microwave identification tag constructed in accordance with the present invention; the tag has antenna elements having extending arms trimmed to arranged sizes.
Figure 3:
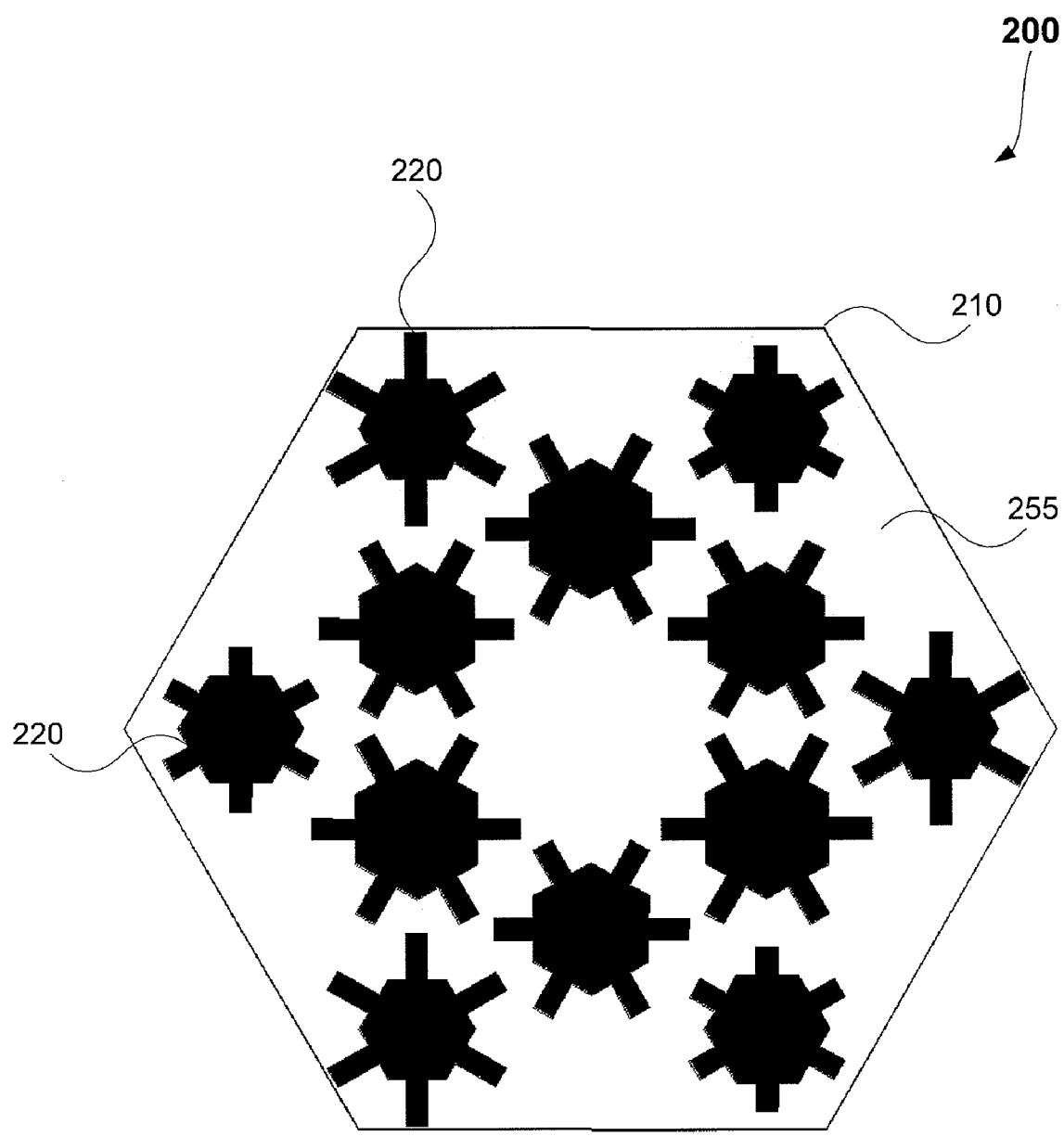
FIG. 3 is a plan view of a bottom surface of an embodiment of a chipless microwave identification tag constructed in accordance with the present invention; the tag has antenna elements which are antenna elements with extending arms trimmed to arranged sizes.

Referring to FIGS. 2 and 3, a plan view of a top surface 205 and bottom surface 255 of an exemplary chipless microwave identification tag 200 is depicted. The tag 200 has a dielectric substrate 210. Antenna elements 220 having an equal number of extending arms 221 are located on the surfaces 205 and 255 of the substrate 210. Alternatively, the substrate 210 may have an array of antenna elements 220 only on the top surface 205 or bottom surface 255. The antenna elements 220 are made from a conductive material, for example, copper or a conductive polymer. The size of antenna elements 220 and the associated extending arms 221 are selected to have specific microwave resonation. Their size alters the response of the reverse/reflected wave at a number of specific frequencies to identify the occurrence of an individual tag 200 when read by an incident/forward microwave signal. This response is then decoded to reveal the specific identification number of the tag 200.

Due to the interactions and interference among the antenna elements 220 and the associated extending arms 221, the identification number of the tag 200 cannot be predetermined and encoded based only on the construction of the antenna elements 220 and extending arms 221. Instead, the determination of the identification number of the tag 200 and encoding is performed based on the specific microwave resonation measured after the fabrication of the tag 200.

In order to have a large number of tag combinations operating at a small bandwidth, tags 200 with more complicated designs and coding systems are created. In one example, a total of 24 antenna elements 220 (12 on each of the surfaces 205, 255 of the substrate 210) are arranged. Each antenna element 220 has 6 extending arms 221 of equal length. The antenna elements 220 are divided into 8 groups and each group has 3 identical antenna elements 220 and extending arms 221. Sizes of the 8 groups of antenna elements (between flat surfaces) are 0.85 mm, 0.9 mm, 1.0 mm, 1.1 mm, 1.4 mm, 1.5 mm, 1.6 mm, and 1.7 mm. The length of the 6 extending arms 221 of each group of antenna elements 220 can be from 0.00 mm to 0.45 mm. There are a total of 10 possible steps in length with a step value of 0.05 mm. The lengths of the extending arms 221 of the 8 groups of antenna elements 220 determine the tag 200 number. FIGS. 2 and 3 illustrate an example of an embodiment of a tag 200 with specific lengths for the extending arms 221.

A pure binary coding system is used to number the tags 200 based on the measurement of the microwave resonation of the response from each tag 200 when read by an incident microwave signal. The chosen microwave band of operation is from 14 to 18 GHz. This is a bandwidth of 4 GHz. The bandwidth is divided into 100 equal frequency slots which can also be recognized as bits and thus each frequency slot (or each bit) occupies 0.04 GHz. If any microwave resonation is detected and the strength of any resonation is increased by a certain value, for example, increased by 5 dB (or 3.16 times) during the frequency slot, a code number "1" is assigned to the bit. If microwave resonation is not detected or the strength of any resonation is reduced by a certain value, for example, reduced by 5 dB (or by 0.316 times) during the frequency slot, a code number "0" is assigned to the bit.

The frequency slot between 14.0000-14.0399 GHz is assigned as the least significant bit (LSB) which has the lowest weighting of the coding system and it is referred to as the bit "0". The frequency slot between 17.9600-17.9999 GHz is assigned as the most significant bit (MSB) which has the highest weighting of the coding system and is referred to as the bit "99".

The maximum number of combination if each of the 8 groups of extending arms 221 has 10 possible lengths is "$10^8$=100,000,000". The number of combination of tags 200 remains very large even after tags 200 with identical microwave resonations are excluded. For 16 possible lengths (0.00 to 0.75 mm) the maximum number of combinations is "$16^8$=4,294,967,296".

For example, a tag 200 with 10 resonance frequencies measured:

16.28 GHz=bit 57, 16.52 GHz=bit 63,
16.56 GHz=bit 64, 16.60 GHz=bit 65,
16.76 GHz=bit 69, 16.80 GHz=bit 70,
16.84 GHz=bit 71, 17.16 GHz=bit 79,
17.64 GHz=bit 91, 17.68 GHz=bit 92

The tag ID:

In Binary form =

0000 0001 1000 0000 0000 1000 0000 1110 0011 1000
0010 0000 0000 0000 0000 0000 0000 0000 0000 0000
0000 0000 0000 0000 0000

In Hex form = 0180080$E$38200000000000000

Figure 4:
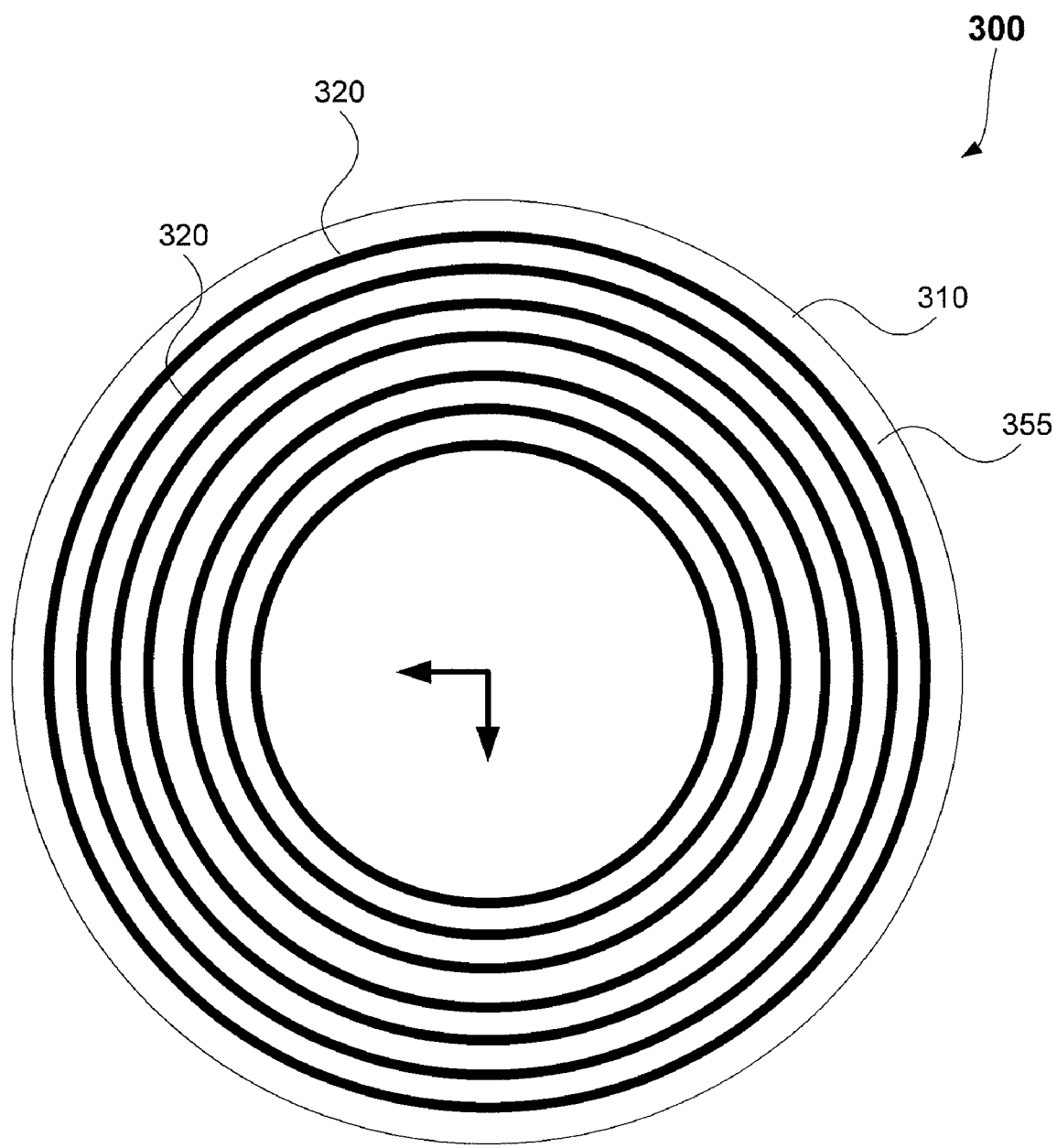
FIG. 4 is a plan view of a top surface of a second embodiment of a chipless microwave identification tag constructed in accordance with the present invention; the tag has antenna elements which are concentric rings trimmed to arranged sizes.
Figure 5:
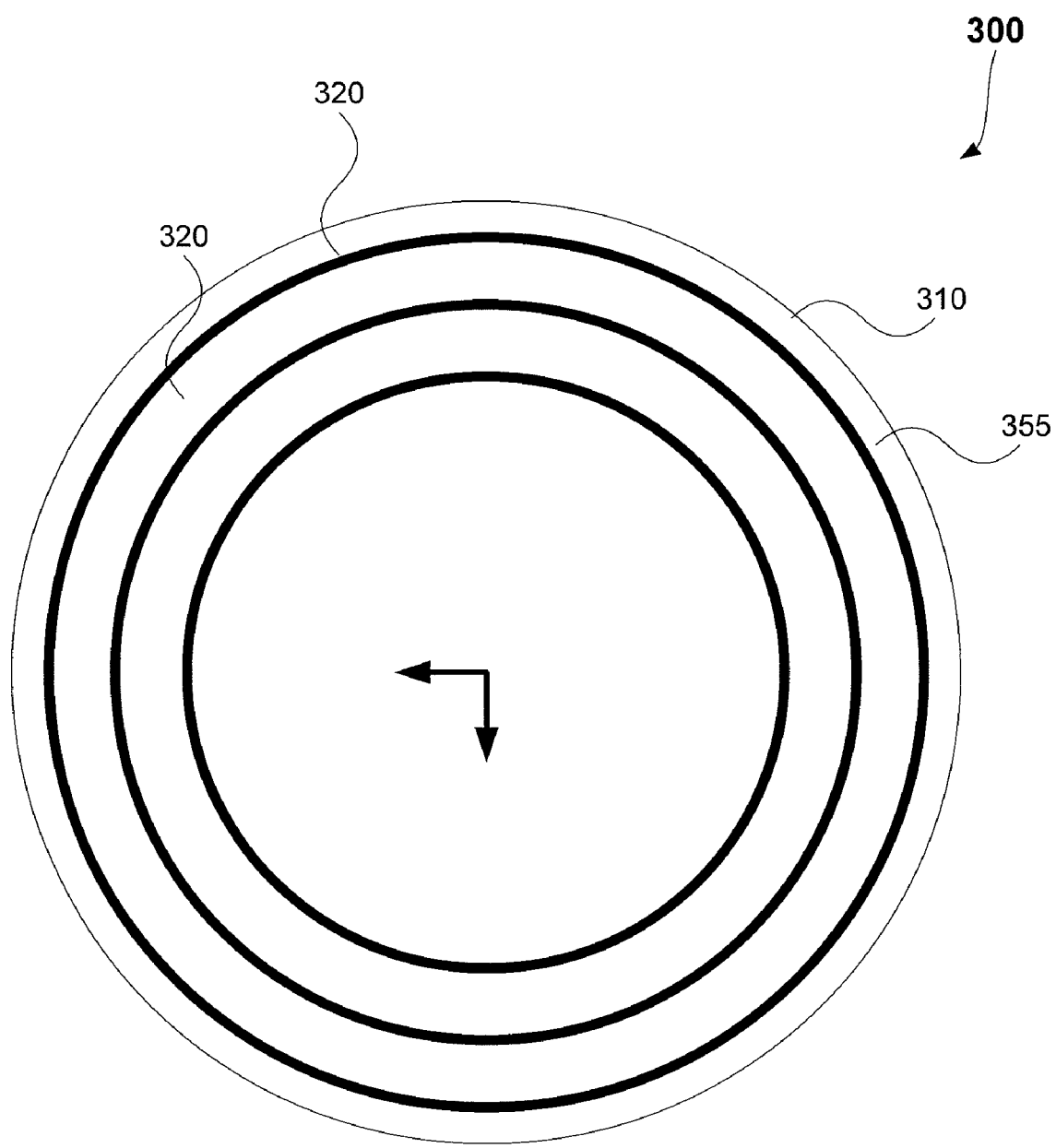
FIG. 5 is a plan view of a bottom surface of a second embodiment of a chipless microwave identification tag constructed in accordance with the present invention; the tag has antenna elements which are concentric rings trimmed to arranged sizes.

Referring to FIGS. 4 and 5, a plan view of a top surface 305 and a plan view of a bottom surface 355 of a second embodiment of a chipless microwave identification tag 300 is depicted. The tag 300 has a dielectric substrate 310. On the surfaces 305 and 355 of the substrate 310 are antenna elements 320 comprising concentric rings trimmed to predetermined sizes. The substrate 310 may alternatively have an array of antenna elements 320 only on the top surface 305 or bottom surface 355 rather than both surfaces 305, 355. The antenna elements 320 are made from a conductive material. The sizes of antenna elements 320 are selected to have specific microwave resonation which can alter the response of the reflected wave at a number of specific frequencies. The reflected wave enables the identification of the existence of a tag 300 when read by an incident microwave signal. This response is then decoded to reveal the specific chipless microwave identification tag 300 number.

Figure 6:
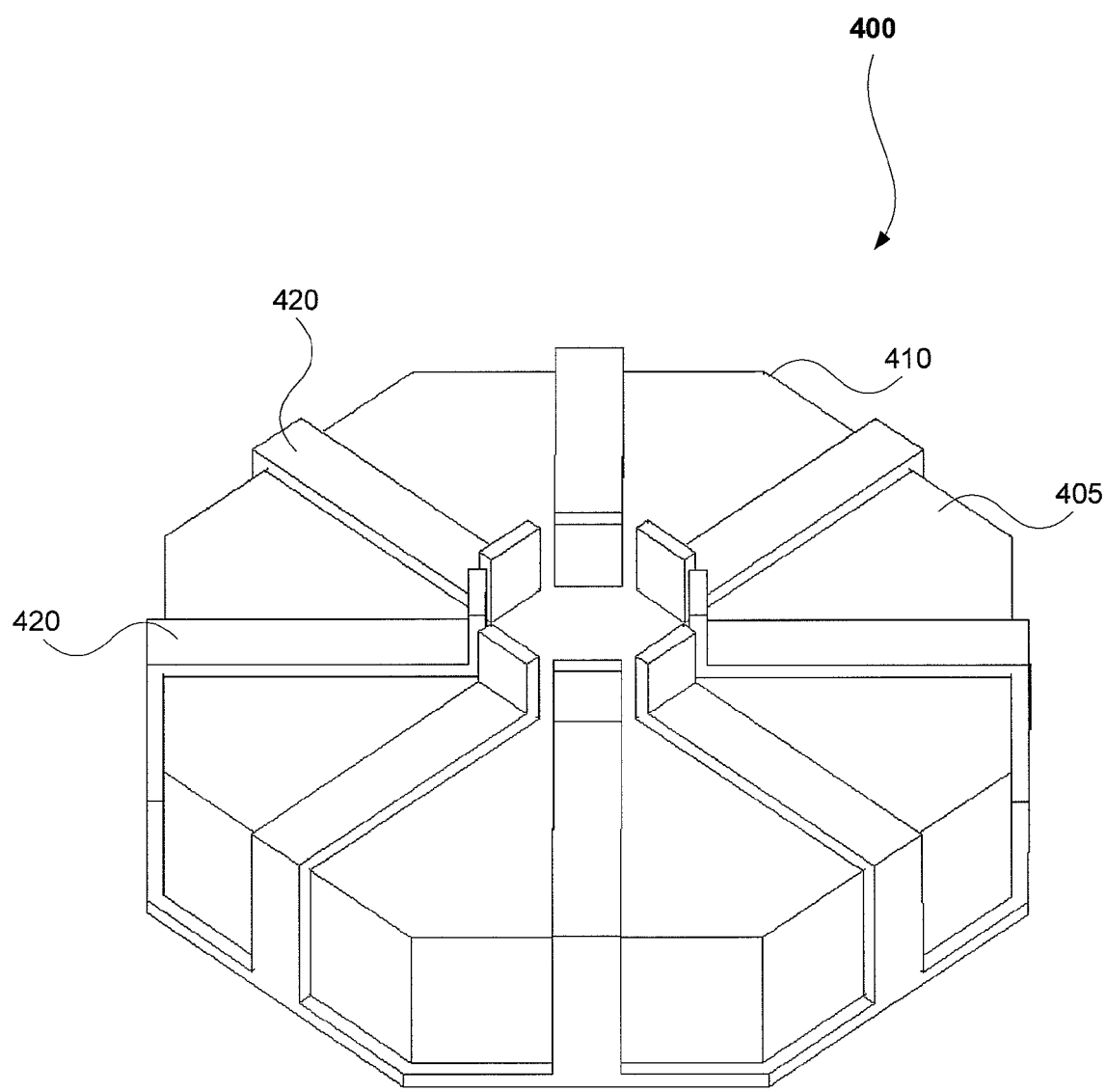
FIG. 6 is an isometric view of a third embodiment of a chipless microwave identification tag constructed in accordance with the present invention; the tag has antenna elements which are pads with extending arms trimmed to arranged sizes.

Referring to FIG. 6, a perspective view from above of a third embodiment of a chipless microwave identification tag 400 is depicted. The tag 400 has a substrate 410. On the top surface 405 of the substrate 410 are antenna elements 420 comprising pads with extending arms trimmed to predetermined sizes. The antenna elements 420 are made from a conductive material. The size of antenna elements 420 are selected to have a specific microwave resonation which alters the response of the reflected wave at a number of specific frequencies. The reflected wave enables identification of the existing of a tag 400 when read by an incident microwave signal. This response is then decoded to reveal the specific chipless microwave identification tag 400 number.

Figure 7:
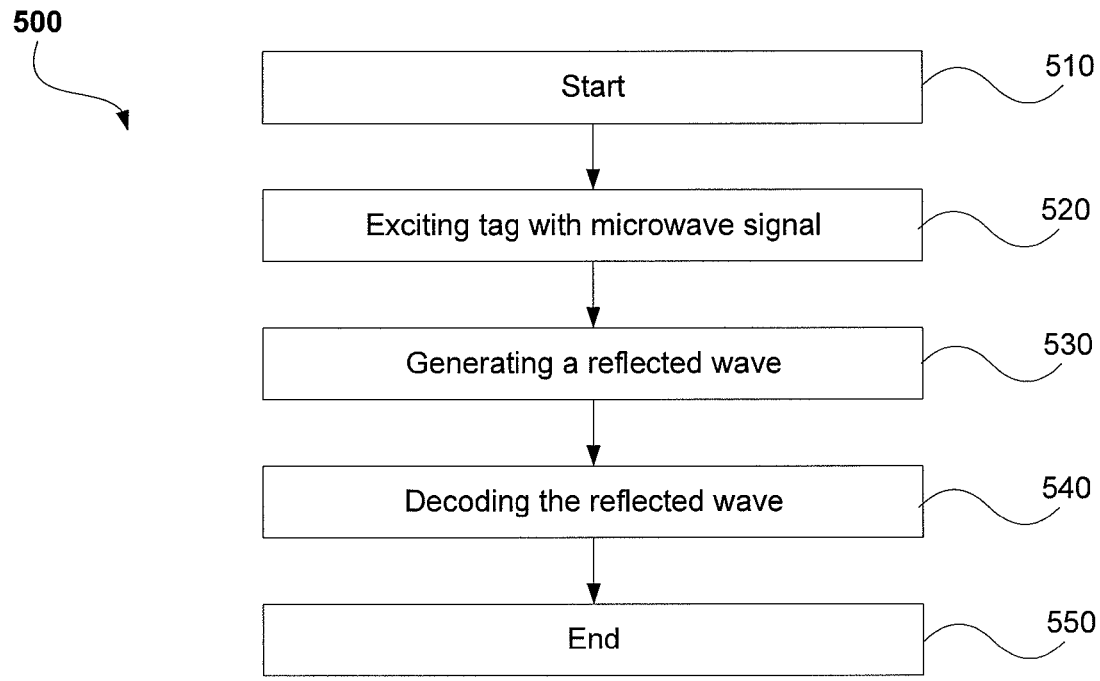
FIG. 7 is a process flow diagram of a method of operating a chipless microwave identification tag carried out according to the present invention.

Referring to FIG. 7, a method 500 of operating a chipless microwave identification tag is depicted. The method begins with a start step. The method 500 requires exciting 520 a chipless microwave identification tag with an incident microwave signal. In response to the excitation, a reflected wave is generated 530 with a number of specific frequencies altered by microwave resonation which is determined by the size of antenna elements. The antenna elements can be in the form of concentric rings or pads with extending arms. The reflected wave generated by the tag is decoded 540 to yield an identification number based on the number of specific frequencies which are considered to be the signature code of the tag. The method finishes with an end step 550.

Figure 8:
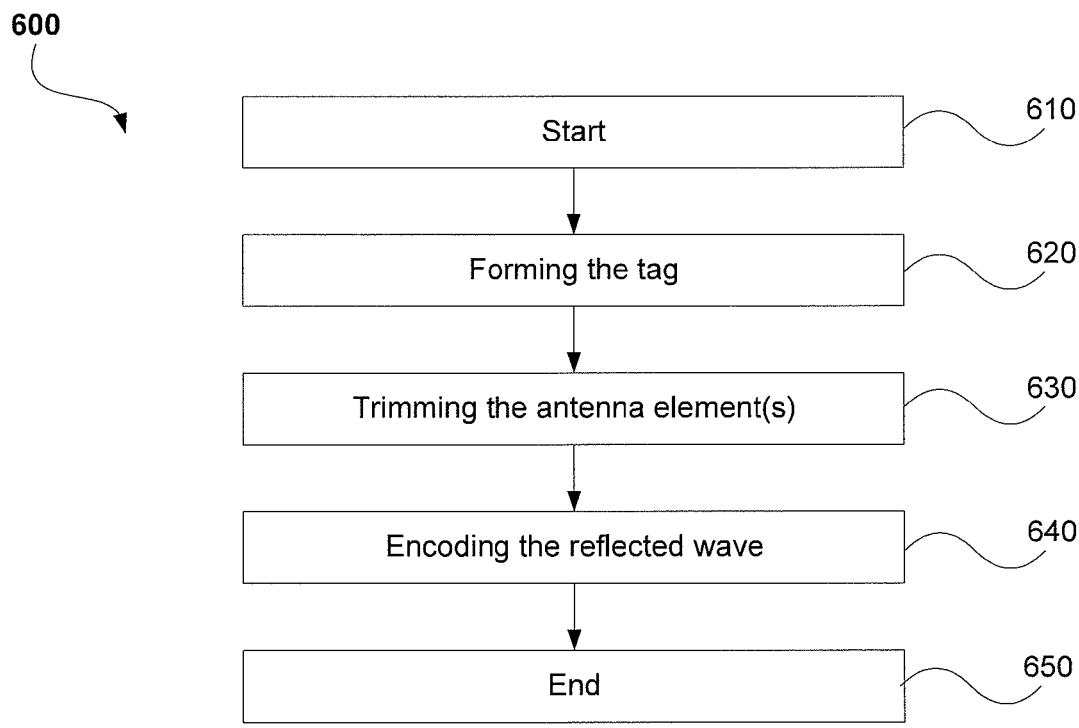
FIG. 8 is a process flow diagram of a method of manufacturing a chipless microwave identification tag carried out according to the present invention.

Referring to FIG. 8, a method 600 of manufacturing a chipless microwave identification tag is depicted. The method begins with a start step 610. A chipless microwave identification tag with antenna elements on one or both surfaces of a substrate is formed 620. A micro/nano injection moulding machine is used to form the tag by moulding the conductive polymer onto a ceramic which functions as the substrate. A double-moulding technique can also be used if the ceramic is replaced by a non-conductive polymer. The antenna elements may be formed as concentric rings or pads with extending arms. The antenna elements are trimmed 630 to arranged sizes. The tag is encoded 640 with an identification number which is based on the number of specific frequencies present in the reflected wave when the tag is excited by an incident microwave signal. Therefore, a full set of tags is produced by merely requiring trimming 630 and encoding 640. Manufacturing cost is reduced because only a single mould is required.

The three embodiments of the present invention described include an array of antenna elements which can have extending arms, antenna elements comprising a number of concentric rings, or antenna elements comprising pads with extending arms. It is envisaged that alterations and modifications to these embodiments are possible to those skilled in the art. The present invention is intended to include all such modifications and alterations insofar as they come within the scope of the present invention.

The sizes and shapes of the antenna elements are arranged to have microwave resonation which can alter the response of the reflected wave at a number of specific frequencies to identify the occurrence of a tag when read by an incident microwave signal. The tag can be formed using a micro/nano injection moulding machine to achieve the required low cost, small size, and accuracy. The antenna elements on the substrate of the tag are trimmed to arranged sizes and the tag is encoded based on the number of specific frequencies present in the reflected wave.

Although an identification number has been described, any coding system may be used to identify a tag including letters of the alphabet, symbols, numbers or any combination thereof.

It will be appreciated by persons skilled in the art that numerous variations and/or modifications may be made to the invention as shown in the specific embodiments without departing from the scope or spirit of the invention as broadly described. The present embodiments are, therefore, to be considered in all respects illustrative and not restrictive.

We claim:

1. A chipless microwave identification tag comprising:
a dielectric substrate; and
a plurality of antenna elements made from a conductive material and disposed on at least one surface of the dielectric substrate;
wherein when the tag is excited by an incident microwave signal, a reflected wave to identify the tag is generated with a number of specific frequencies altered by microwave resonation of the antenna elements;
wherein the microwave band of operation for the tag is from 14 to 18 GHz and is divided into 100 equal frequency slots, each frequency slot corresponding to a bit occupying 0.04 GHz; and
wherein if the strength of any microwave resonation is larger than a predetermined value, a code number "1" is assigned to the bit; and if the strength of any resonation is less than the predetermined value, a code number "0" is assigned to the bit.

2. The tag according to claim 1, wherein the predetermined value is 5 dB changes during the frequency slot.

3. The tag according to claim 1, where the reflected wave is decoded to obtain an identification number of the tag.

4. A method for identifying a chipless microwave identification tag having antenna elements, the method comprising:
exciting the tag using an incident microwave signal; and
decoding a reflected wave generated in response to the microwave excitation, the reflected wave having a number of specific frequencies altered by microwave resonation of the antenna elements;
wherein if the strength of any microwave resonation is larger than a predetermined value, a code number "1" is assigned to a bit corresponding to a frequency slot for the microwave band of operation for the tag; and if the strength of any resonation is less than the predetermined value, a code number "0" is assigned to the bit.

5. The method according to claim 4, wherein the decoding of the reflected wave obtains an identification number of the tag.

6. The method according to claim 4, wherein the predetermined value is 5 dB changes during the frequency slot.

7. A system for identifying a chipless microwave identification tag, the system comprising:
- a microwave signal generator to excite the tag using an incident microwave signal;
- a reader to decode a reflected wave generated in response to the microwave excitation, the reflected wave having a number of specific frequencies altered by microwave resonation of the antenna elements; and
- a signal processing module to obtain an identification number of the tag by determining if the strength of any microwave resonation is larger than a predetermined value, a code number "1" is assigned to a bit corresponding to a frequency slot for the microwave band of operation for the tag; and if the strength of any resonation is less than the predetermined value, a code number "0" is assigned to the bit.

8. A chipless microwave identification tag comprising:
- a dielectric substrate; and
- a plurality of antenna elements made from a conductive material and disposed on at least one surface of the dielectric substrate;
- wherein when the tag is excited by an incident microwave signal, a reflected wave to identify the tag is generated with a number of specific frequencies altered by microwave resonation of the antenna elements;
- wherein the antenna elements are pads and have a plurality of extending arms, and
- wherein at least one of the pads is a polygon having a plurality of sides and wherein the arms extend from each of the plurality of sides of the at least one of the pads.

9. A chipless microwave identification tag comprising:
- a dielectric substrate; and
- a plurality of antenna elements made from a conductive material and disposed on at least one surface of the dielectric substrate;
- wherein when the taq is excited by an incident microwave signal, a reflected wave to identify the taq is generated with a number of specific frequencies altered by microwave resonation of the antenna elements;
- wherein the antenna elements are pads and have a plurality of extending arms, and
- wherein at least one of the pads is a hexagon having a six sides and wherein the arms extend from each of the six sides of the hexagon.

* * * * *